(No Model.)
S. COLLING.
BATTERY CELL FOR ELECTRIC BELTS.
No. 394,958. Patented Dec. 25, 1888.
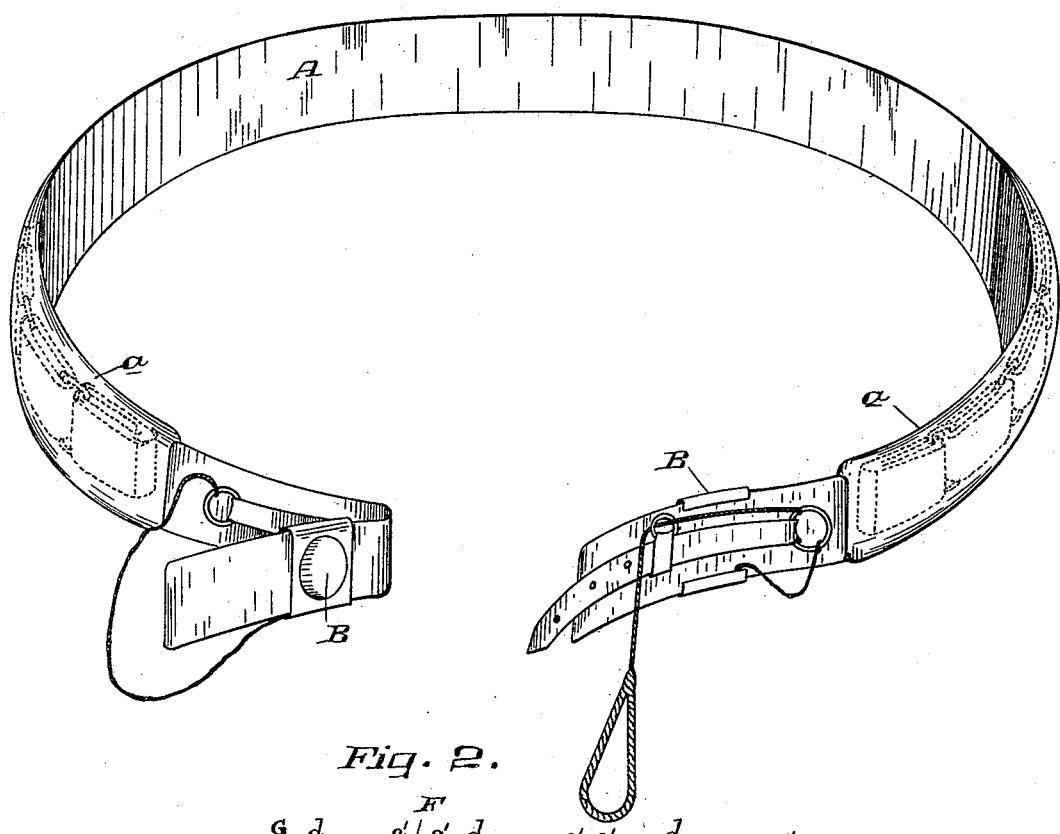
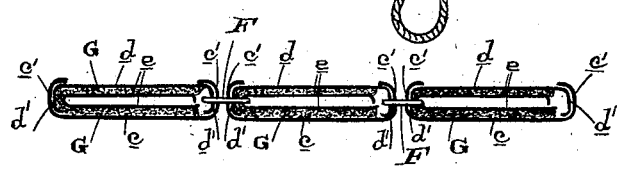
Witnesses,
Geo. H. Strong
J. H. Rourke
Inventor,
S. Colling
By Dewey & Co.
atty

UNITED STATES PATENT OFFICE.

SIMEON COLLING, OF OAKLAND, CALIFORNIA.

BATTERY-CELL FOR ELECTRIC BELTS.

SPECIFICATION forming part of Letters Patent No. 394,958, dated December 25, 1888.

Application filed October 15, 1888. Serial No. 288,145. (No model.)

*To all whom it may concern:*

Be it known that I, SIMEON COLLING, of Oakland, Alameda county, State of California, have invented an Improvement in Electric Belts; and I hereby declare the following to be a full, clear, and exact description of the same.

My invention relates to that class of electric or galvanic belts in which a number of separate independent cells or batteries are connected together flexibly, the whole being attached to a suitable band which is fitted to the wearer.

My invention consists in the hereinafter-described novel construction of the independent cells or batteries and the connection in series.

The object of my invention is to construct in a belt of this class a cell or battery which can be readily disconnected from the adjacent ones, and can be easily taken to pieces for the purpose of renewing the parts.

Referring to the accompanying drawings for a more complete explanation of my invention, Figure 1 is a perspective view of my belt. Fig. 2 is a longitudinal section through the cells or batteries.

A is the band which forms the body of the belt, said band being made in the ordinary way, adapted to fasten around the wearer, and provided with the usual electrodes, (designated by B,) and their general wires and other connections, unnecessary herein to describe. In a suitable pocket, $a$, of this band is inserted the connected series of cells or batteries, each one of which is thus constructed: The exterior shell or casing of the battery is made of copper, which is in two parts or sections. One of these parts, $c$, is formed with upturned ends $c'$, while the other part, $d$, is formed with downturned ends $d'$, said latter part being enough smaller than the former part to fit within it, being moved to place sidewise, the ends of the two parts telescoping, so that when said parts are fitted together a complete casing of a flat, elongated, or oblong shape is made. The two parts of copper are not fastened together, but are simply held in place by having the ends of one fit within the ends of the other, so that the inner or smaller part may be slipped sidewise from the larger or outer part, thereby entirely separating the two parts, so as to gain access to the interior.

Within the outer shell or casing is located a zinc plate, $e$, which is formed of a sheet of metal bent centrally and transversely upon itself, so as to bring its ends together, said ends, however, not being fastened in any way, but remaining separate. Between the inner zinc plate and the outer copper casing is a layer of felt, G, or other suitable absorbent material usually found in belts of this class.

The separate batteries or cells are connected together by means of copper links or bails F, one side of which is fitted in and is in contact with the folded or unbroken end of the zinc plate, while the other side is fitted within and in contact with the adjacent end of the outside or copper plate.

Now in putting the cells together, the sliding part $d$ of the copper casing is removed from the other part, $c$, so as to expose the end of the latter. The copper bail is then passed down into said end and forced through the open or slitted end of the zinc plate $e$, being then pushed up to the folded end of said plate. Then the sliding part $d$ of the copper casing is replaced, and that cell is complete. The other side of the same copper bail is fitted into the exposed end of the copper part $c$ of the adjacent cell or battery, from which the sliding part $d$ has been previously removed. When in place, the movable copper part $d$ is then put back, and the two cells or batteries are thus connected.

It will be seen that by this construction any battery or cell of the series may be readily removed and another put in its place; or it may have its parts renewed and then replaced.

I am aware that the cells or batteries of these belts have been made with separable parts, and I am also aware that the outside or copper casing has been made in two parts, hinged together so that they may be opened out, and I do not therefore claim such, broadly; but

What I do claim as new, and desire to secure by Letters Patent, is—

1. In an electric belt, the cell or battery having its outer plate or casing made in two separate parts, each part having its ends turned, whereby one is adapted to slip into the other, substantially as herein described.

2. In an electric belt, a cell or battery having its outer plate or casing made in two independent and separable parts, with turned or bent ends, one part having its ends turned in a direction opposite to the ends of the other part, whereby one part may be fitted within the other by telescoping laterally, their turned ends overlapping, substantially as herein described.

3. In an electric belt, a cell or battery consisting of an outer casing of copper made in two independent separable parts, with correspondingly-curved ends, one of said parts sliding into the other, these ends telescoping, an inner zinc plate made of a single piece folded upon itself and having its meeting ends separate, and a layer of absorbent material between the zinc plate and the copper casing, substantially as herein described.

4. In an electric belt, a battery or cell consisting of an outer casing of copper made in independent separable parts, with bent or turned ends fitting and telescoping one another, an inner zinc plate folded upon itself and having the ends separate, and an intervening layer of absorbent material, in combination with the connecting bails or links, one side of which is fitted within the folded end of the zinc plate and the other within the overlapping ends of the parts of the copper casing, substantially as herein described.

In witness whereof I have hereunto set my hand.

SIMEON COLLING.

Witnesses:
S. H. NOURSE,
H. C. LEE.